(12) United States Patent
Vigeant et al.

(10) Patent No.: US 8,661,936 B2
(45) Date of Patent: Mar. 4, 2014

(54) TRIM PLATE FOR STEERING WHEEL

(75) Inventors: Peter L. Vigeant, Troy, MI (US); Michael A. Schorle, St. Clair Shores, MI (US); Michael J. Olesko, Ann Arbor, MI (US)

(73) Assignee: Toyoda Gosei Co. Ltd., Aichi (JP)

( * ) Notice: Subject to any disclaimer, the term of this patent is extended or adjusted under 35 U.S.C. 154(b) by 2746 days.

(21) Appl. No.: 11/344,301

(22) Filed: Jan. 31, 2006

(65) Prior Publication Data

US 2007/0193399 A1    Aug. 23, 2007

(51) Int. Cl.
*B62D 1/04* (2006.01)
*B60R 21/05* (2006.01)
*B62D 1/10* (2006.01)
*B62D 1/11* (2006.01)

(52) U.S. Cl.
CPC . *B60R 21/05* (2013.01); *B62D 1/10* (2013.01); *B62D 1/11* (2013.01)
USPC ........................... 74/552; 280/728.2; 280/731

(58) Field of Classification Search
USPC ............ 74/552, 558.5; 200/61.54; 280/728.2, 280/728.3, 731
IPC ........................................................ B62D 1/04
See application file for complete search history.

(56) References Cited

U.S. PATENT DOCUMENTS

| | | | |
|---|---|---|---|
| 4,777,840 A * | 10/1988 | Endo et al. ...................... | 74/552 |
| 5,275,455 A | 1/1994 | Harney et al. | |
| 5,345,721 A | 9/1994 | Stein et al. | |
| 5,383,682 A | 1/1995 | Nagata et al. | |
| 5,667,868 A | 9/1997 | Freeman | |
| 5,997,031 A * | 12/1999 | Heilig ......................... | 280/728.3 |
| 6,095,594 A | 8/2000 | Riddle et al. | |
| 6,276,109 B1 | 8/2001 | Hingorani et al. | |
| 6,378,931 B1 | 4/2002 | Kolluri et al. | |
| 6,422,643 B1 | 7/2002 | Pease | |
| 6,460,874 B1 | 10/2002 | McDonnell et al. | |
| 6,484,370 B2 | 11/2002 | Kanie et al. | |
| 6,592,142 B2 * | 7/2003 | Landen et al. ............. | 280/728.2 |
| 6,624,365 B2 * | 9/2003 | Miyako et al. ............. | 200/61.54 |
| 6,681,543 B2 | 1/2004 | Nada et al. | |
| 6,813,865 B2 | 11/2004 | Peterson | |
| 6,874,386 B2 * | 4/2005 | Xu et al. ......................... | 74/552 |
| 6,932,416 B2 | 8/2005 | Clauson | |

(Continued)

FOREIGN PATENT DOCUMENTS

DE     37 00 422         7/1987
DE     296 15 261 U1     1/1997

(Continued)

OTHER PUBLICATIONS

European Search Report for Application No. 07001887.4, May 30, 2007.

*Primary Examiner* — Vinh Luong
(74) *Attorney, Agent, or Firm* — Carlson, Gaskey & Olds P.C

(57) ABSTRACT

A steering wheel assembly includes an armature having spokes over which a spoke ends of a steering wheel are molded. A back cover connects to the armature and the steering wheel. A trim plate snap-fits directly to the spoke ends of the steering wheel and to the back cover, without connecting directly to the armature. Because the trim plates are directly connected to the same two components with which the trim plates must provide proper fit and finish, proper fit and finish is ensured.

11 Claims, 7 Drawing Sheets

(56) References Cited

U.S. PATENT DOCUMENTS

| | | | |
|---|---|---|---|
| 6,941,836 B2 * | 9/2005 | Umemura et al. | 74/552 |
| 7,012,202 B2 * | 3/2006 | Mizukoshi | 200/61.54 |
| 7,148,437 B2 * | 12/2006 | Wahl et al. | 200/61.54 |
| 7,490,852 B2 * | 2/2009 | Marotzke et al. | 280/731 |
| 7,556,282 B2 * | 7/2009 | Vigeant et al. | 280/728.2 |
| 7,654,563 B2 * | 2/2010 | Soderquist | 280/731 |
| 2002/0046936 A1 * | 4/2002 | Ibe et al. | 200/61.54 |
| 2004/0135394 A1 | 7/2004 | Clauson | |
| 2005/0189779 A1 | 9/2005 | Wojewnik | |
| 2005/0252332 A1 * | 11/2005 | Miltenberger et al. | 74/552 |
| 2008/0053268 A1 * | 3/2008 | Matsu et al. | 74/558.5 |

FOREIGN PATENT DOCUMENTS

| | | | |
|---|---|---|---|
| EP | 0 464 693 | 1/1992 | |
| EP | 1 004 496 | 5/2000 | |
| FR | 2 401 816 | 3/1979 | |
| JP | 2002 347630 | * 12/2002 | B60R 21/20 |
| JP | 2004-142553 | * 5/2004 | B62D 1/04 |

\* cited by examiner

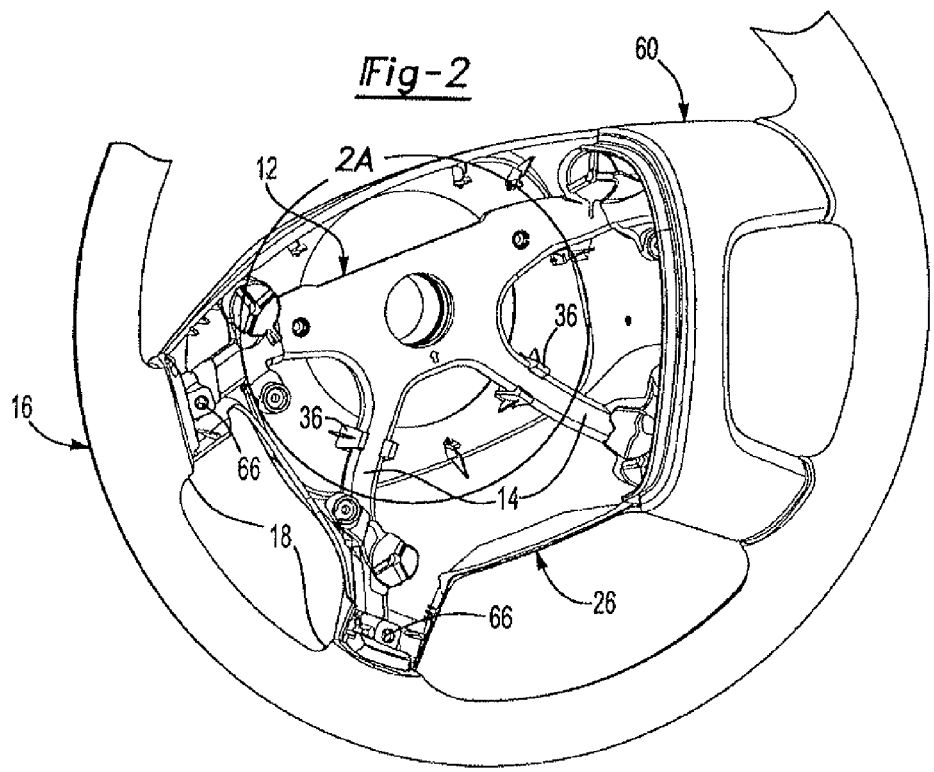
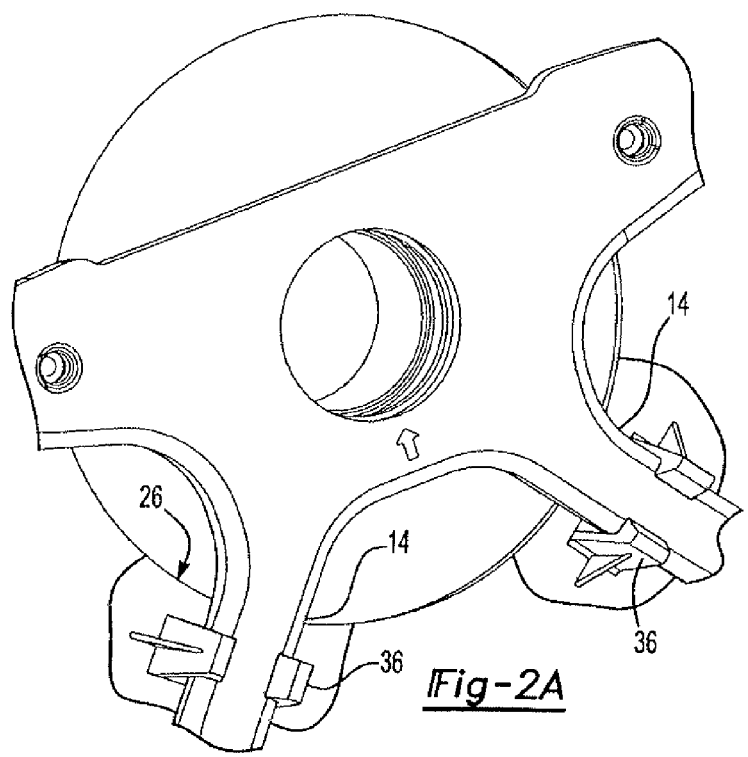

TRIM PLATE FOR STEERING WHEEL

BACKGROUND OF THE INVENTION

The present invention relates generally to a steering wheel assembly.

Steering wheel trim plates (also known as "steering wheel bezels") are fitted on a vehicle steering wheel to conceal the armature, horn/airbag bracket, etc. Specifically, one trim plate is fitted to each side of the steering wheel airbag cover for a total of two trim plates per steering wheel assembly. As an alternative, a single U-shaped trim plate may be used. One type of steering wheel includes a metal steering wheel armature to which is molded a urethane covering layer. A back cover connects to the armature and covering layer to cover the armature. The back cover can also be molded integrally with the covering layer urethane. The trim plates cover front portions of the armature on either side of the airbag assembly.

In the prior art, these trim plates have been held in place with separate fasteners that connect to the armature. This arrangement has several distinct disadvantages. First, any variation in the positioning of the insert-molded armature relative to the covering layer will also affect the positioning of the trim plates, resulting in poor fit and finish. As a result, the trim plates may not align properly with the covering layer and the back cover. Second, the additional fasteners in this arrangement require extra expense both in terms of parts and labor.

SUMMARY OF THE INVENTION

In the present invention, the trim plates are connected directly to the covering layer and the back cover, not the armature. Because the trim plates are directly connected to the same two components with which the trim plates must provide proper fit and finish, proper fit and finish is ensured. Any variation in the position of the armature relative to the covering layer or back cover will not affect the alignment of the finish surfaces. The trim plates can pivot and flex sufficiently to provide ideal alignment. Also, proper fit and finish can be adjusted and tuned simply by modifying the snap-fit connectors on the trim panel, without needing to modify the connectors on the back cover or the covering layer.

The trim plates are easily assembled to the steering wheel assembly because of the snap-fit connections. The trim plates can also be easily removed and replaced, if necessary. Separate fasteners are eliminated, reducing the number of parts and installation time.

BRIEF DESCRIPTION OF THE DRAWINGS

Other advantages of the present invention can be understood by reference to the following detailed description when considered in connection with the accompanying drawings wherein:

FIG. 2 is a perspective view of the partially-assembled steering wheel and back cover of FIG. 1.

FIG. 2A is an enlarged view of the portion A of FIG. 2.

DETAILED DESCRIPTION OF THE PREFERRED EMBODIMENTS

Figure 1:
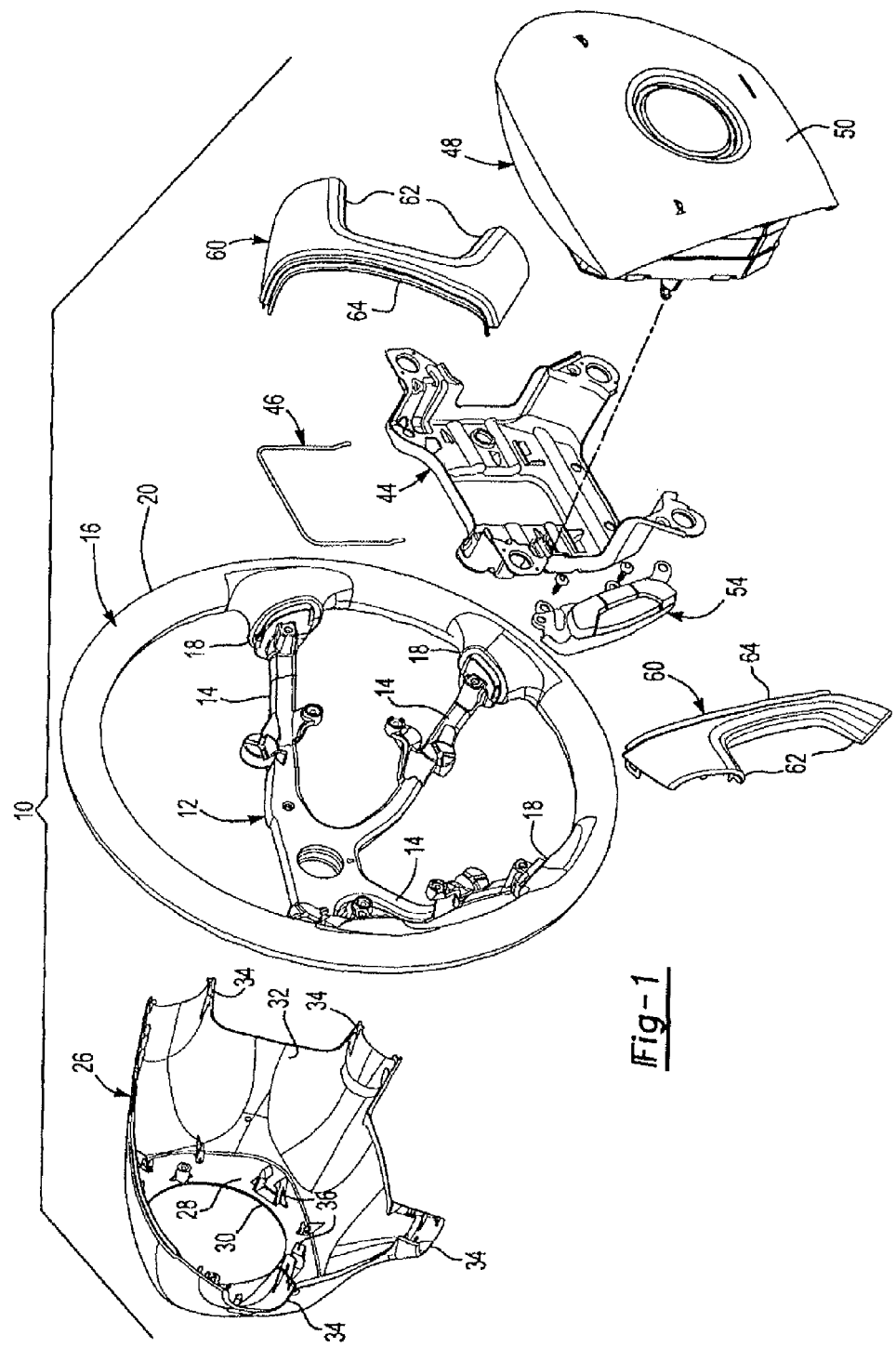
FIG. 1 is an exploded perspective view of a steering wheel assembly according to the present invention.

A steering wheel assembly 10 according to the present invention is shown in FIG. 1. The steering wheel assembly 10 has a steering wheel including a metal armature 12 having radially extending spokes 14 and a urethane covering layer 16. The covering layer 16 includes integrally molded spoke ends 18 extending radially inwardly from a ring portion 20, each overmolded over one of the spokes 14 of the armature 12.

The steering wheel assembly 10 further includes a molded plastic back cover 26 having a rear wall 28 with a central opening 30. Side walls 32 extend forwardly from the rear wall 28, including spoke portions 34. The rear wall 28 includes connectors 36. The back cover 26 could alternatively be molded integrally with the covering layer 16.

A stamped metal horn bracket 44 includes a spring connector 46 for connecting the horn bracket 44 to a floating horn switch/airbag assembly 48 having a front panel 50. An optional electrical switch assembly 54 can be included to control in-vehicle entertainment, climate control or cruise control, etc. A pair of plastic trim plates (or bezels) 60 each include a pair of spoke portions 62 extending outward and a flange 64 on an inner edge.

FIG. 2 is a perspective view of the partially-assembled steering wheel back cover 26 and one trim plate 60 of FIG. 1. Each of the spoke ends 18 of the covering layer 16 includes a molded snap-fit receptacle 66. The trim plates 60 (one shown in FIG. 2) connect to the covering layer 16 and back cover 26 over portions of the spokes 14 of the armature 12.

FIG. 2A is an enlarged view of the portion A of FIG. 2. The connectors 36 of the back cover 26 snap-fit to the spokes 14 of the armature 12. The rear wall 28 of the back cover 26 may also be connected to the armature 12 by a fastener, such as by a screw.

Figure 3:
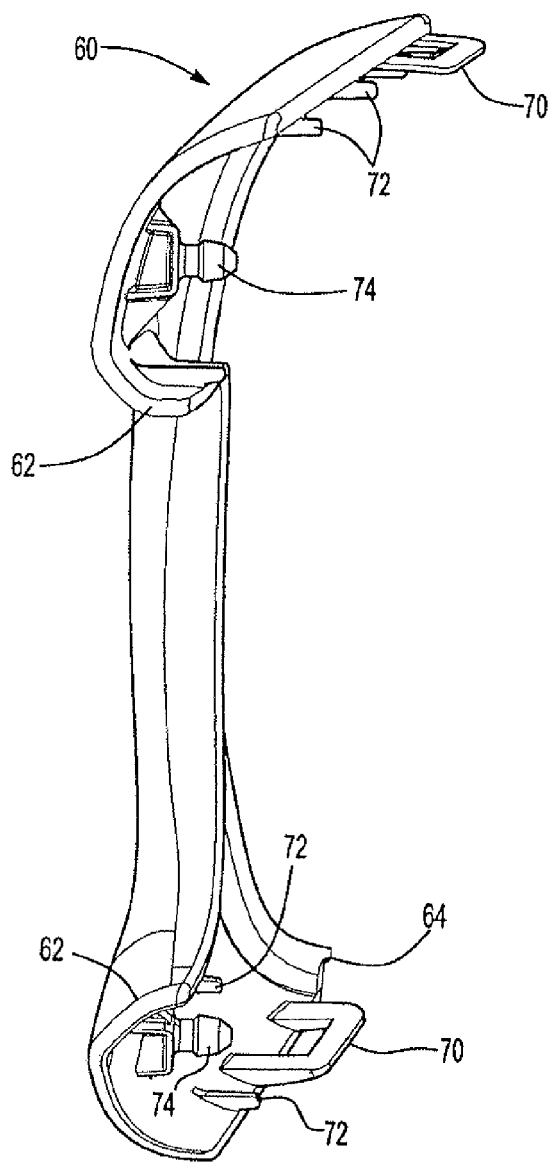
FIG. 3 is a perspective view of one of the trim plates of FIG. 1.

FIG. 3 is a perspective view of one of the trim plates 60 of FIG. 1. A pair of loop connectors 70 protrude downwardly from the interior surface of an inner end of the trim plate 60. The loop connectors 70 are adjacent the inner flange 64 and a pair of male snap-fit connectors 74 are adjacent an outer end. The trim plate 60 includes protruding alignment fingers 72 adjacent loop connectors 70.

Figure 4:
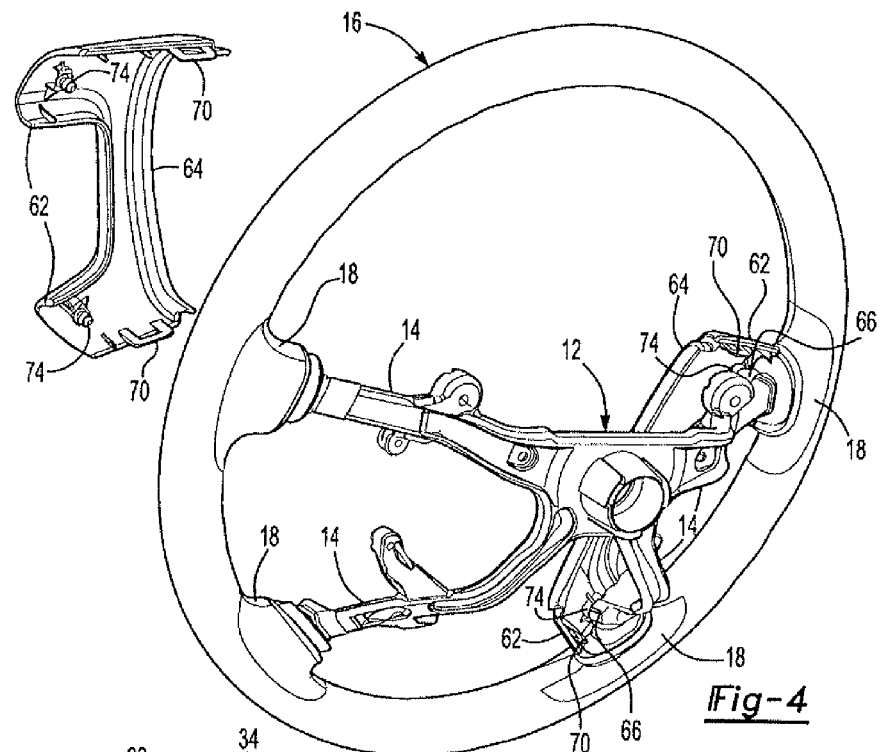
FIG. 4 is a rear perspective view of the steering wheel and trim plates (horn bracket not shown for clarity).

FIG. 4 is a rear perspective view of the covering layer 16, armature 12 and trim plates 60 (horn bracket 44 not shown for clarity). The trim plates 60 are connected to the covering layer 16 by snap-fitting the male snap-fit connectors 74 into the receptacles 66 on the spoke ends 18.

Figure 5:
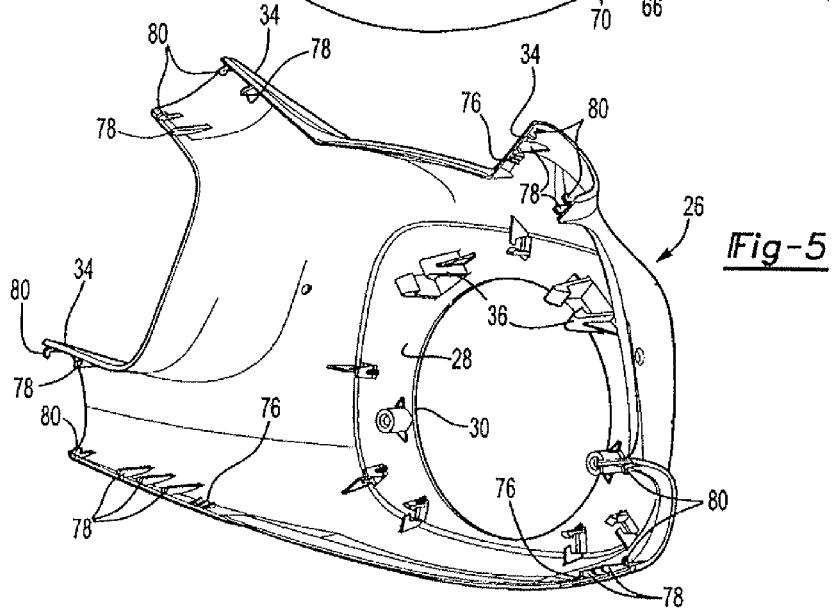
FIG. 5 is an interior perspective view of the back cover of FIG. 1.

FIG. 5 is a perspective view of the back cover 26. The spoke portions 34 of the back cover include connectors 76 complementary to loop connectors 70 on trim plates 60 (FIG. 4). Alignment fingers 78 protrude upwardly from edges of the spoke portions 34, as do hooks 80 (for connection to the spoke ends 18 of the covering layer 16).

Figure 6:
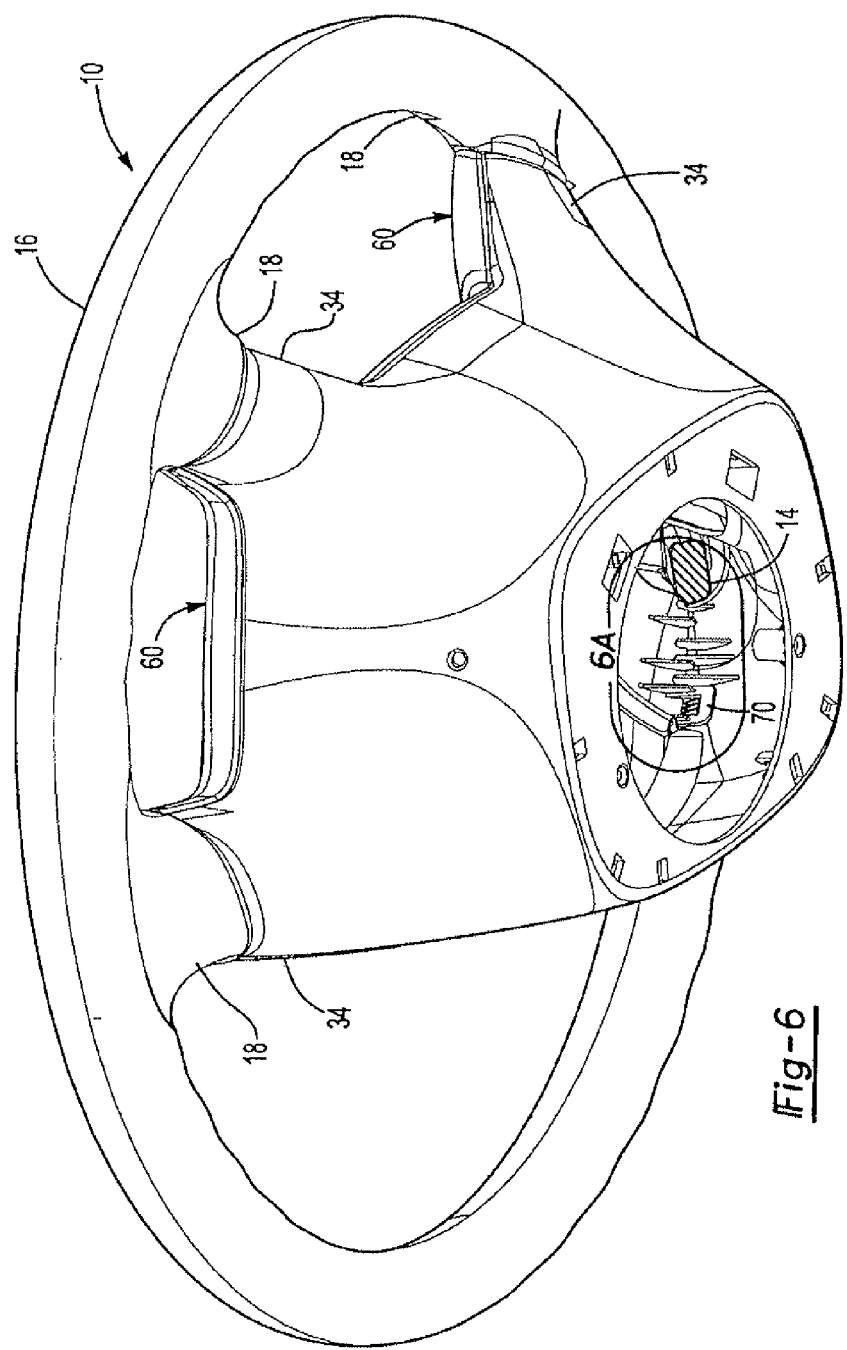
FIG. 6 is a rear perspective view of the assembly of FIG. 1.

FIG. 6 is a rear perspective view of the assembled steering wheel assembly 10, with the horn bracket 44 not shown and with the armature 12 cut away for clarity. The trim plates 60 mate with the spoke ends 18 and the back cover 26. Because the trim plates 60 are directly connected only to the spoke ends 18 of the covering layer 16 and the back cover 26, the trim plates 60 are automatically aligned.

Figure 6A:
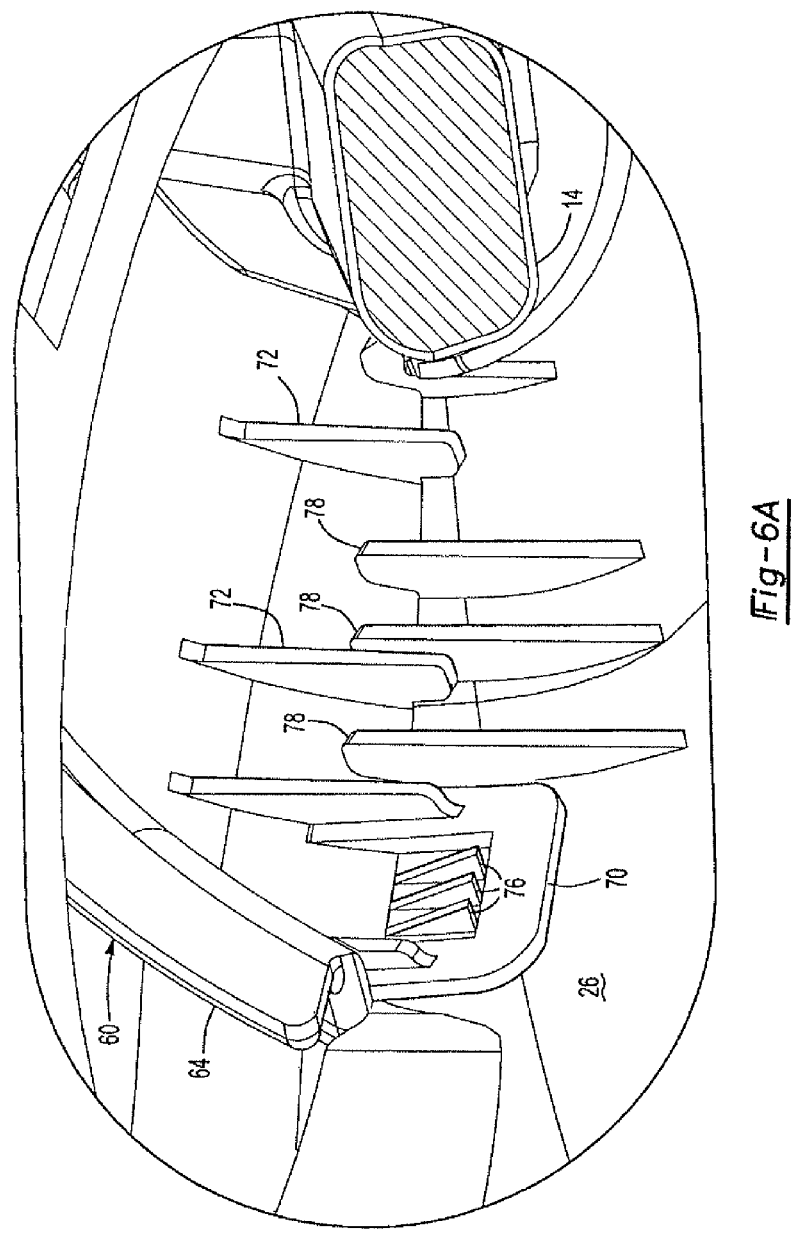
FIG. 6A is an enlarged view of the area 6A of FIG. 6.

FIG. 6A is an enlarged view of the area 6A of FIG. 6 showing the connection of the trim plate 60 to the back cover 26. The alignment fingers 72, 78 interlock with the edges of the trim plate 60 and back cover 26 to ensure and maintain proper alignment. The loop connector 70 of the trim plate 60 snap-fits to the complementary inclined connectors 76.

Figure 7:
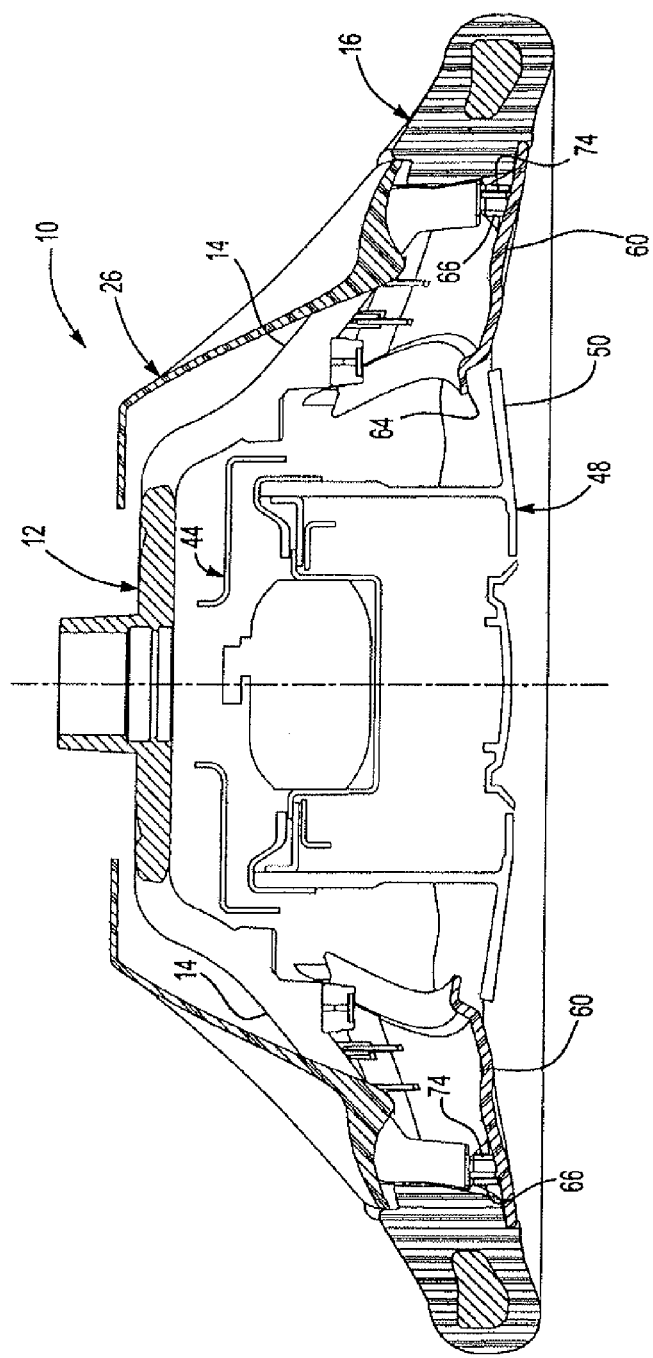
FIG. 7 is a section view taken along line 7-7 of the assembled steering wheel assembly of FIG. 1.

FIG. 7 is a section view through the assembled steering wheel assembly 10. The connection of the trim plates 60 to the covering layer 16 and the back cover 26 permits variances in the position of the armature 12 relative to the covering layer 16 (in the overmolding or insert-molding process) while ensuring alignment of the trim plates 60 to the visible surfaces, the back cover 26 and the spoke ends 18 of the covering layer. Additionally, the attachment arrangement permits the floating horn switch/airbag assembly 48 to move relative to the trim plates 60. In particular, a gap is provided between the front panel 50 of the floating horn switch/airbag assembly 48 and the flanges 64 of the trim plates 60 so that the floating horn switch/airbag assembly 48 can be moved relative to the trim plate 60.

The trim plates 60 are easily assembled to the steering wheel assembly 10 because of the snap-fit connections. The trim plates 60 can also be easily removed and replaced, if necessary. Because the trim plates 60 are connected only to the covering layer 16 and the back cover 26, the trim plates 60 are assured of aligning properly with the finish surfaces of the covering layer 16 and the back cover 26 (FIG. 6). Any variation in the position of the armature 12 relative to the covering layer 16 or back cover 26 will not affect the alignment of the finish surfaces. The trim plates 60 can pivot and flex sufficiently to ensure ideal fit and finish. Separate fasteners are eliminated, reducing the number of parts and installation time. The trim plates 60 remain fastened to the covering layer 16 and back cover 26 even in the event of airbag deployment.

As an additional benefit, the size, shape and location of the loop connectors 70 and the male snap-fit connectors 74 can be tuned and adjusted to change the ease of assembly and retention strength or to change the alignment of the trim plates 60 relative to the adjacent fit and finish parts. Because the trim plates 60 are directly connected to the same two components with which the trim plates 60 must provide proper fit and finish, proper fit and finish is ensured and can be adjusted simply by modifying the connectors 70, 74.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers on method steps are for convenient reference in dependent claims and do not signify a required sequence of performance unless otherwise indicated in the claims.

What is claimed is:

1. A steering wheel assembly comprising:
    an armature having a plurality of spokes;
    a molded covering layer secured to the spokes of the armature;
    a back cover in physical contact with and secured to the armature; and
    a trim plate directly attached to the covering layer and the back cover and wherein said back cover and said trim plate are not one piece, wherein the trim plate is not secured to the armature other than via the covering layer and the back cover.

2. The steering wheel assembly of claim 1 further comprising;
    a switch assembly inboard of said trim plate.

3. A steering wheel assembly comprising:
    an armature having a plurality of spokes;
    a molded covering layer secured to the spokes of the armature;
    a back cover in physical contact with and secured to the armature; and
    a trim plate directly attached to the covering layer and the back cover and wherein said back cover and said trim plate are not one piece, wherein the trim plate is snap-fit to the covering layer.

4. The steering wheel assembly of claim 3 wherein the trim plate is snap-fit to the back cover.

5. A steering wheel assembly comprising:
    an armature having a plurality of spokes;
    a molded covering layer secured to the spokes of the armature, the covering layer including a ring portion and a spoke end extending radially inwardly from the ring portion, the spoke end overmolded over one of the spokes of the armature;
    a back cover in physical contact with and secured to the armature; and
    a trim plate directly attached to the covering layer and the back cover and wherein said back cover and said trim plate are not one piece, wherein the trim plate is snap-fit to the spoke end.

6. The steering wheel assembly of claim 5 wherein the trim plate is snap-fit to the back cover.

7. The steering wheel assembly of claim 6 wherein the trim plate snap-fits with the back cover at a location that is under the location where the trim plate snap-fits with the covering layer.

8. The steering wheel assembly of claim 6 wherein the trim plate snap-fits with the back cover at a location that is between a location where the trim plate snap-fits with the covering layer and a location where the back cover is secured to the armature.

9. A steering wheel assembly comprising:
    an armature having a plurality of spokes;
    a molded covering layer secured to the spokes of the armature;
    a back cover in physical contact with and secured to the armature;
    a trim plate directly attached to the covering layer and the back cover and wherein said back cover and said trim plate are not one piece; and
    a floating horn assembly mounted to the armature.

10. A steering wheel assembly comprising:
    an armature having a plurality of spokes;
    a molded covering layer secured to the spokes of the armature;
    a back cover in physical contact with and secured to the armature; and
    a first trim plate directly attached to the covering layer at one of said spokes and the back cover and
    a second trim plate directly attached to the covering layer at another of said spokes and the back cover.

11. The steering wheel assembly of claim 10 wherein said back cover and said trim plates are not one piece.

* * * * *